United States Patent
Barczak et al.

(10) Patent No.: US 10,223,271 B2
(45) Date of Patent: Mar. 5, 2019

(54) APPARATUS, COMPUTER PROGRAM PRODUCT, AND METHOD TO PERFORM CACHE OPERATIONS IN A SOLID STATE DRIVE

(71) Applicant: INTEL CORPORATION, Santa Clara, CA (US)

(72) Inventors: Mariusz Barczak, Gdansk (PL); Piotr Wysocki, Gdansk (PL)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 15/476,885

(22) Filed: Mar. 31, 2017

(65) Prior Publication Data
US 2018/0285275 A1    Oct. 4, 2018

(51) Int. Cl.
*G06F 12/08* (2016.01)
*G06F 12/0868* (2016.01)
*G06F 12/0871* (2016.01)
*G06F 12/0891* (2016.01)

(52) U.S. Cl.
CPC ...... *G06F 12/0868* (2013.01); *G06F 12/0871* (2013.01); *G06F 12/0891* (2013.01); *G06F 2212/222* (2013.01); *G06F 2212/225* (2013.01)

(58) Field of Classification Search
CPC ............. G06F 12/0868; G06F 12/0871; G06F 12/0891
See application file for complete search history.

(56) References Cited

U.S. PATENT DOCUMENTS

| | | | |
|---|---|---|---|
| 7,480,657 B1* | 1/2009 | Glovin | G06F 17/30902 |
| 2002/0059330 A1* | 5/2002 | Molnar | G06F 9/465 |
| 2005/0171981 A1* | 8/2005 | Molnar | G06F 9/465 |
| 2013/0042056 A1 | 2/2013 | Shats et al. | |
| 2013/0191601 A1 | 7/2013 | Peterson et al. | |
| 2017/0052903 A1 | 2/2017 | Ash et al. | |
| 2017/0116130 A1* | 4/2017 | Sundaravaradan | G06F 12/0888 |
| 2017/0168958 A1* | 6/2017 | van Greunen | G06F 12/12 |

OTHER PUBLICATIONS

Akerson, D., "NVM Express Introduction & Tutorial", International Openfabrics Software Developers Workshop, Mar. 15-18, 2015, 17 pp.

(Continued)

*Primary Examiner* — Than Nguyen
(74) *Attorney, Agent, or Firm* — Konrad Raynes Davda & Victor LLP; David W. Victor

(57) ABSTRACT

Provided are an apparatus, computer program product, and method to perform cache operations in a solid state drive. A cache memory determines whether data for a requested storage address in a primary storage namespace received from a host system is stored at an address in the cache memory namespace to which the requested storage address maps according to a cache mapping scheme. Multiple of the storage addresses in the primary storage map to one address in the cache memory namespace. The cache memory returns to the host system the data at the requested address stored in the cache memory namespace in response to determining that the data for the requested storage address is stored in the cache memory namespace.

19 Claims, 8 Drawing Sheets

(56) References Cited

OTHER PUBLICATIONS

Batwara, A., "Leveraging Host Based Flash Translation Layer for Application Acceleration", Flash Memory Summit 2012, 30 pp.
Intel Corporation, "Intel Cache Acceleration Software", [online], [Retrieved on Mar. 31, 2017], Retrieved from the Internet at <URL: http://www.intel.com/content/www/us/en/software/intel-cache-accelerati . . . >, 5 pp.
Marmol, L., et al., "NVMKV: A Scalable, Lightweight, FTL-Aware Key-Value Store", Proceedings of the 2015 USENIX Annual Technical Conference, Jul. 8-10 2015, 13 pp.
NVM Express, "NVMe Overview", [online], [Retrieved on Mar. 31, 2017], Retrieved from the Internet at <URL: http://www.nvmexpress.org/wp-content/uploads/NVMe_Overview.pdf>, 5 pp.
Sengupta, S., et al., "Flash Memory Aware Software Architectures and Applications", [online], [Retrieved on Mar. 10, 2017], Retrieved from the Internet at <URL: http://www.bswd.com/FMS11/FMS11-Sengupta.pdf>, 54 pp.
Shen, Z., et al., "Optimizing Flash-Based Key-Value Cache Systems", 8th USENIX Workshop on Hot Topics in Storage and File Systems, 2016, 5 pp.
Wikipedia, "Cache Acceleration Software", [Online], Last Modified on Mar. 16, 2017, [Retrieved on Mar. 31, 2017], Retrieved from the Internet at <URL: https://en.wikipedia.org/wiki/Cache_Acceleration_Software>, 2 pp.
Extended European Search Report for EP Application No. 18154456, dated Jul. 18, 2018, 8 pp. [77.391EP (EPSR)].

\* cited by examiner

APPARATUS, COMPUTER PROGRAM PRODUCT, AND METHOD TO PERFORM CACHE OPERATIONS IN A SOLID STATE DRIVE

TECHNICAL FIELD

Embodiments described herein generally relate to an apparatus, computer program product, and method to perform cache operations in a solid state drive.

BACKGROUND

Host side cache management operations may consume significant host resources to determine where to place data in a faster storage device, such as the Solid State Drive (SSD), that is directed to an address for a larger, typically, slower storage device, for example a Hard Disk Drive (HDD) or a Hybrid Hard Drive. For a direct mapped cache, the host system applies a hash function to a portion of the address of the data to determine a unique location in the faster storage device at which the data for that address is stored. The host system has to check whether data for a different address other than the read address is not located in the direct mapped cache location in the faster storage device, because multiple addresses from the larger slower storage device map to one address in the faster storage device. If data for the read address not at the direct mapped location in the faster storage device, then there is a read miss and the host needs to retrieve data from the slower storage device.

BRIEF DESCRIPTION OF THE DRAWINGS

Embodiments are described by way of example, with reference to the accompanying drawings, which are not drawn to scale, in which like reference numerals refer to similar elements.

DESCRIPTION OF EMBODIMENTS

With current caching implementations, significant latency is introduced in a read hit process by having the host system perform cache look-up operations, which requires additional software layers in an Input/Output stack of the operating system. Described embodiments implement the caching operations in a Solid State Drive (SSD) operating as the cache storage device instead of additional layers in a storage stack of the host system to reduce cache latency.

With described embodiments, Input/Output (I/O) requests are passed directly from the host system to a Solid State Drive (SSD) operating as a cache to primary storage device(s) to bypass a cache software layer in the host system. In this way, a host-side cache algorithm is not involved and cache software on the host side does not check if requested data is available in a host cache. The SSD may use cache management techniques to determine if a requested address in a non-volatile memory in the SSD was previously written. If so, the data is returned from the SSD. If the SSD does not have the requested data, then the SSD returns a message to the host system to have the host access the data from the primary ("slower") storage device. Further, the host system may configure a namespace size in the SSD which reflects a namespace of the primary storage device, which may be larger than a non-volatile memory namespace available at the SSD.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage device electronic assemblies. Embodiments include both devices and methods for forming electronic assemblies.

Figure 1:
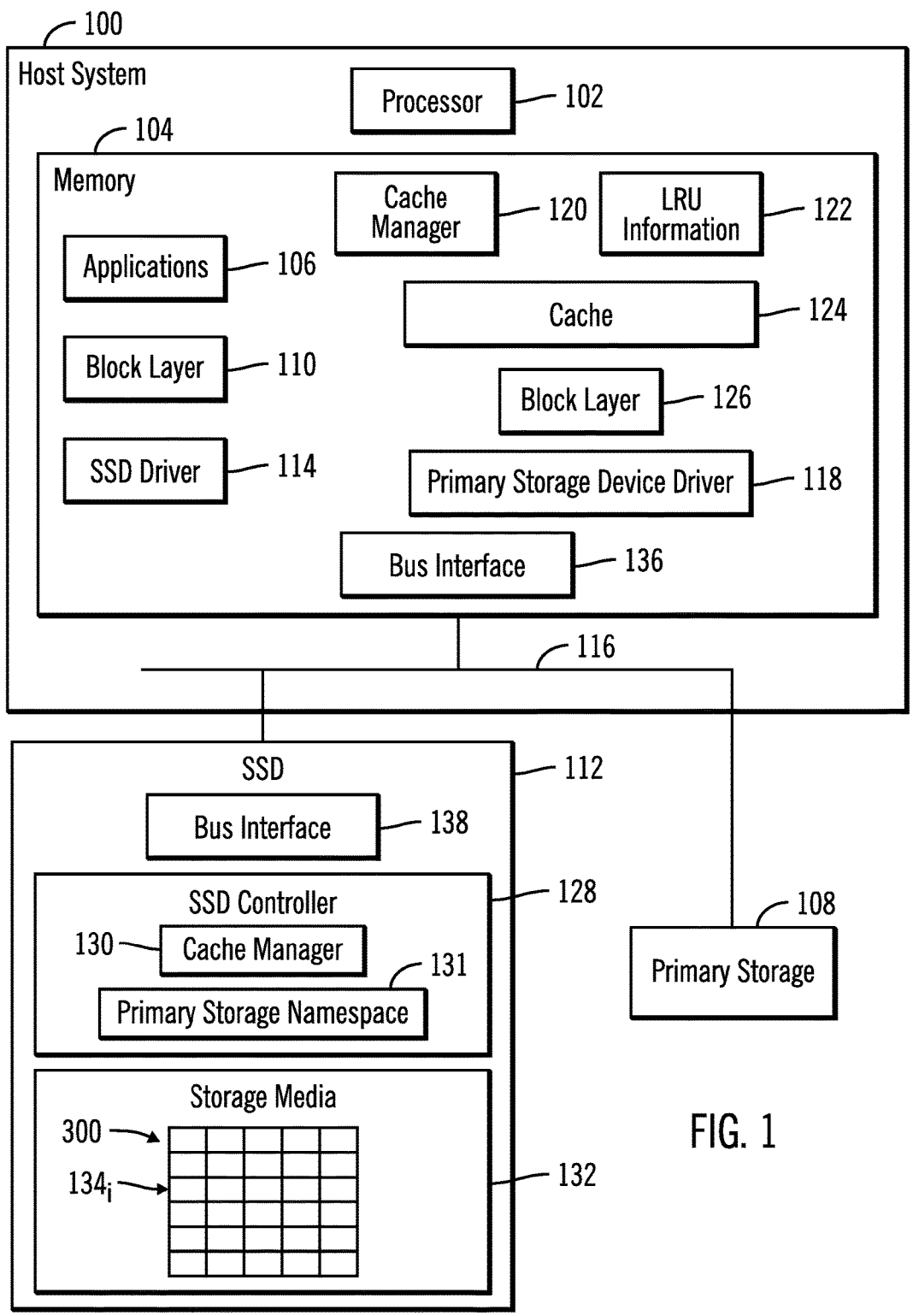
FIG. 1 illustrates an embodiment of a computing system.

FIG. 1 illustrates an embodiment of a host system 100 having a processor 102 including a plurality of processing cores, and a memory 104 including applications 106 to communicate read and write requests to storage addresses in a connected primary storage 108, such as one or more block addressable devices, to a block layer 110 that queues and schedules Input/Output (I/O) and returns data between the applications 106 and a connected SSD 112, which functions as a cache memory for the primary storage 108. The primary storage 108 may comprise a block addressable device and has a larger namespace, or more addresses, than the SSD namespace, which comprises a block addressable device non-volatile memory device, that has less storage capacity than the primary storage 108. The memory 104 includes a SSD driver 114 to manage communication between the host system 100 and the SSD 112 over a bus 116 and a primary storage device driver 118 to manage communication between the host system 100 and the primary storage 108 over the bus 116.

The memory 104 may further include a host-side cache manager 120 to manage read misses and situations where there is not sufficient space in the SSD 112 for new write data for a storage address for the primary storage 108. The host-side cache manager 120 maintains Least Recently Used (LRU) information 122, such as an LRU list, providing an ordered list of target storage addresses cached in the SSD 112 and a cache 124 of the memory 104 for caching data when there is a read miss or eviction operation. A block layer 126 may queue and schedule I/O requests and returned data for I/O requests between the primary storage 108 and the cache 120.

In additional embodiments, cache eviction techniques other than an LRU cache eviction algorithm may be used to determine data to destage from the cache 124 to make room for more recently accessed data. In such case, the LRU information 122 would comprise other types of cache information indicating data for storage addresses stored in the cache 124 for other such cache eviction and management algorithms.

The SSD 112 includes a controller 128 that includes a non-volatile memory cache manager 130 having a cache mapping scheme, such as set associative cache or other caching algorithm, to map storage addresses for the primary storage 108 to a set of address in the non-volatile memory namespace. For a set associative cache algorithm, data that maps to a set of cache locations may be stored in any cache location of the set to which the storage address for the data to cache maps. The SSD 112 includes a storage media 132 that includes non-volatile memory devices, such as NAND storage dies, in which addressable blocks 300 are maintained to provide cache locations or cache blocks for storage addresses in the primary storage namespace. The storage media 132 may also include future generation nonvolatile memory devices, such as a three dimensional crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. Each set of addresses in the non-volatile memory namespace may comprise a line $134_i$ of block addressable blocks or cache locations.

The SSD 112 further maintains a primary storage namespace 131 setting configured by the host system 100 during initialization, such as by the SSD driver 114, to indicate a size of the primary storage 108 namespace. The SSD cache manager 130 maintains a mapping of addresses in the primary storage namespace 131 to the non-volatile memory namespace. In an embodiment, the host uses the Non-Volatile Memory Express (NVMe) standard (http://www.nvmexpress.org) to communicate with the SSD 112 over the PCIe Bus 116.

The bus 116 may comprise a Peripheral Component Interconnect (PCI) bus, such as the Peripheral Component Interconnect express (PCIe) bus, or any other custom bus. The host 100 and the SSD 112 may each include bus interface 136, 138 components to communicate on the bus 116.

The SSD 112 and devices of the primary storage 108 may comprise the same or different types of block devices, or block addressable devices. In one embodiment, the SSD 112 operating as a cache to the primary storage 108 may comprise a faster access type of device than the devices comprising the primary storage 108. For instance, the SSD 112 may comprise byte addressable write-in-place non-volatile memory (for example, 3D crosspoint) and the primary storage 108 may comprise one or more hard disk drives or slower access SSDs comprising block addressable non-volatile memory (for example, NAND).

The memory 104 may comprise a suitable memory device, such as a volatile memory device, used for system memory, such as a dynamic random access memory (DRAM).

The system 100 may also communicate with Input/Output (I/O) devices, which may comprise input devices (e.g., keyboard, touchscreen, mouse, etc.), display devices, graphics cards, ports, network interfaces, etc.

Figure 2:
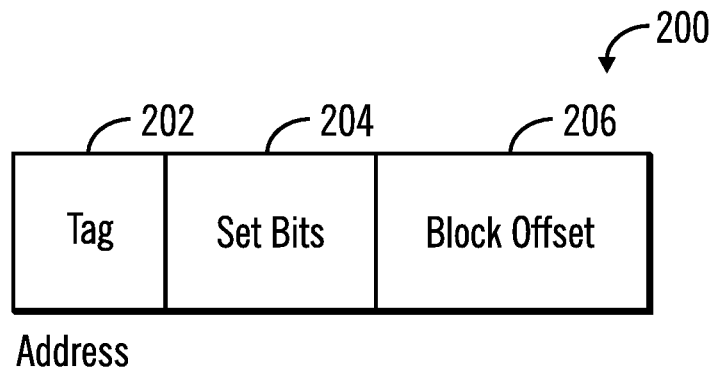
FIG. 2 illustrates an embodiment of an address as known in the prior art.

FIG. 2 illustrates an embodiment of the components of an address 200, as known in the prior art, used to address a location in the primary storage 108 namespace, and includes tag bits 202, such as the most significant bits, that uniquely identify the address 200 in a cache set identified by the set bits 204 of the address 200, and block offset bits 206 comprising least significant bits of the address 200 that are used to locate the data in the cache location.

Figure 3:
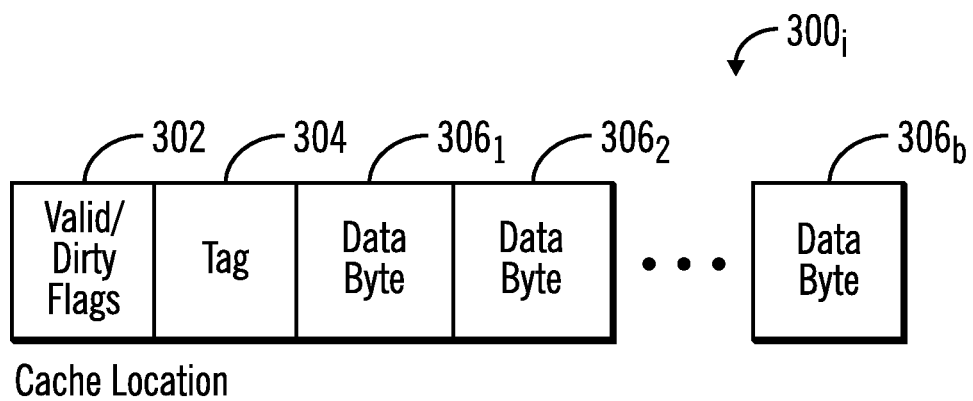
FIG. 3 illustrates an embodiment of content at a cache location in a Solid State Drive (SSD).

FIG. 3 illustrates an embodiment of one of the cache locations $300_i$, also referred to as a cache block, in the SSD 112, and includes a valid/dirty flags 302 indicating whether the cache location $300_i$ has valid data and dirty, e.g., updated, data; a tag 304 having tag bits 202 from the address 200 for the primary storage 108; and one or more data bytes $306_1, 306_2 \ldots 306_b$ for the address 200.

FIG. 1 shows the cache sets identified by the set bits 204 in a storage address 200 as lines, e.g., $134_i$, in the cache locations 300, and each cache location is represented as a box in a cache set $134_i$. Each address 200 in the primary storage 108 may map to any address in a cache set $134_i$, identified by the set bits 204. When finding a location in the cache set $134_i$ for data for a primary storage address 200, the tag bits 202 of the primary storage address 200 are stored in the tag 304 of the cache location $300_i$ in the cache set $134_i$. In set associative cache embodiments, more primary storage addresses 200 would map to a set of addresses than the number of locations in a set.

To decrease latency at the SSD cache manager 130, additional accelerators, such as dedicated hardware Application Specific Integrated Circuit (ASIC) support, may be provided to have the SSD cache manager 130 have a faster I/O processing capability than host processor cores 102. This reduces increased latency that may be experienced on a miss path by having the caching operations handled in the SSD cache manager 130.

In certain embodiments, the non-volatile memory cache manager 130 may comprise flash based key-value (KV) cache system in a flash translation layer (FTL), with native FTL capabilities such as sparse addressing and dynamic mapping using an indirection map. In such embodiments, the SSD cache manager 130 may take a hash of a storage address 200 to determine a direct mapped cache location $300_i$ in the SSD 112 or a slab when a slab-based space management scheme is used. Alternative key-value (KV) caching techniques may be used to map key values to cache locations $300_i$ in the SSD 112 that store values of data for storage addresses.

In further embodiments, the SSD 112 may support a sparse address space.

Figure 4:
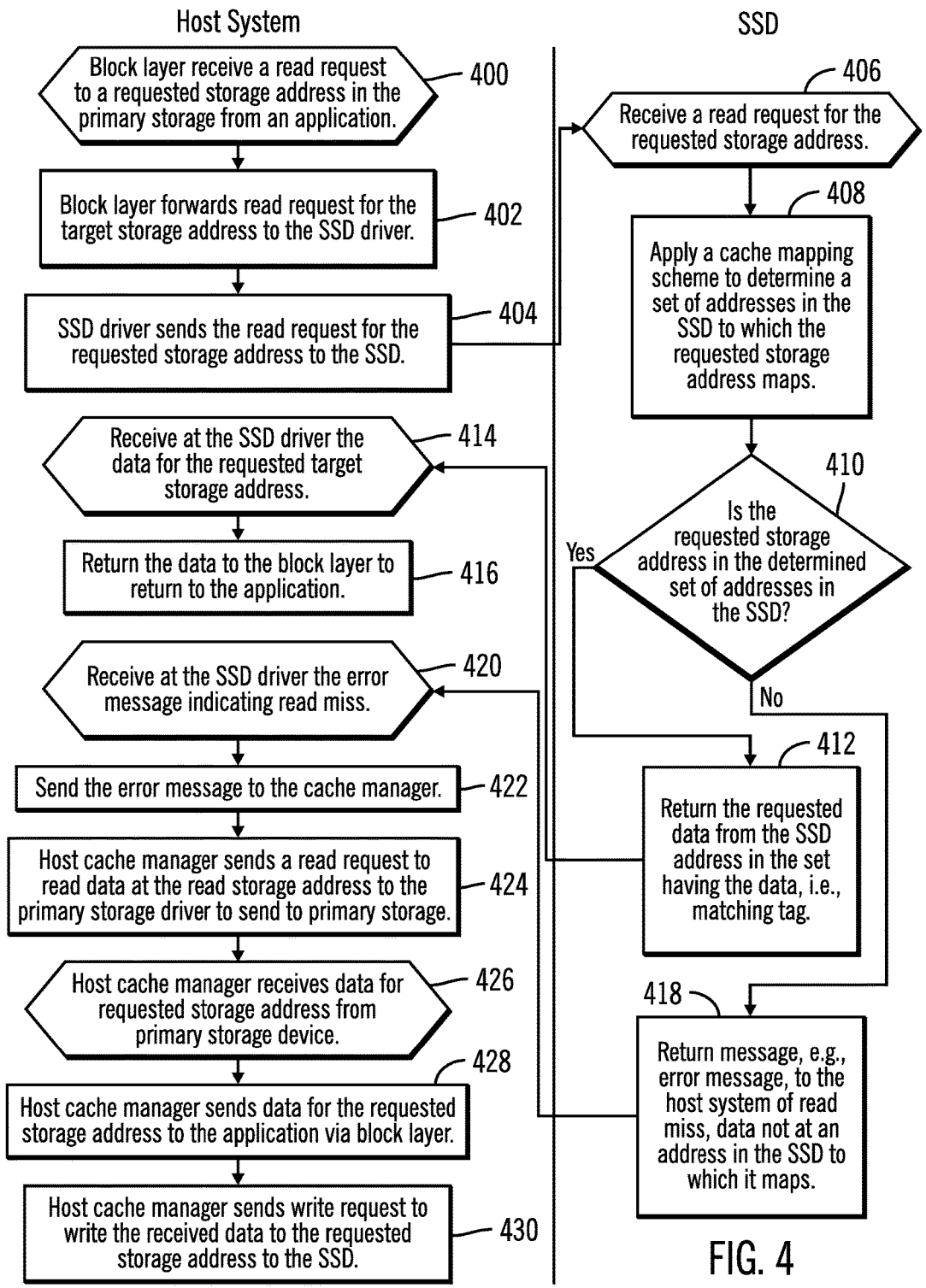
FIG. 4 illustrates an embodiment of operations for a host system and Solid State Drive (SSD) to process a read request.

FIG. 4 illustrates an embodiment of operations performed by the SSD 112 and the host system 100 components to process a read request to a storage address in the primary storage 108. Control begins with the block layer 110 of the host system 100 receiving a read request to a requested storage address $200_R$ in the primary storage 108 from an application 106, where $200_R$ refers to a read address subject to a read request. The block layer 110 forwards (at block 402) the read request for the requested storage address $200_R$ to the SSD driver 114. The SSD driver 114 sends (at block 404) the read request for the requested storage address $200_R$ to the SSD 112.

Upon the SSD 112 receiving (at block 406) the read request, the SSD cache manager 130 determines whether data for the requested storage address $200_R$ is stored in the SSD namespace at an address to which the requested storage address $200_R$ maps according to a cache mapping scheme. In one embodiment, to determine whether the storage address is stored in the SSD cache location $300_i$, the SSD cache manager 130 applies (at block 408) a cache mapping scheme, such as a set associative cache scheme, to determine a set of addresses in the SSD 112, such as a line $134_i$, to which the requested storage address 200 maps. The SSD cache manager 130 determines (at block 410) whether the requested storage address $200_R$ is located in the determined set of addresses $134_i$, such as the tag 202 of the address matches the tag 304 in one cache location $300i$ in the set $134_i$ mapping to the storage address 200. If (at block 410) the requested storage address 200 is located in the set $134_i$, then the SSD cache manager 130 returns (at block 412) the requested data from the SSD address in the set having the data, i.e., matching tag.

Upon the SSD driver 114 receiving (at block 414) the data for the requested storage address 200, the SSD driver 114 (at block 416) returns the data to the application 106 initiating the request via the block layer 110. In this way, a read hit is processed without having to go through the host cache 124, which reduces cache latency at the host system 100 because read data is directly returned to the application from the SSD 112 operating as a cache for the primary storage 108.

If (at block 410) the requested storage address $200_R$ is not in the determined set of addresses $134_i$ in the SSD 112, then the SSD cache manager 130 returns (at block 418) a message, e.g., error message, to the host system 100 of a read miss, data not at an address in the SSD device to which it maps. Upon receiving (at block 420) the error of the read miss, the SSD driver 114 sends (at block 422) the error to the host cache manager 120. The host cache manager 120 sends (at block 424) a read request to read data at the read storage address $200_R$ to the primary storage device driver 118 via the block layer 126 to send to the primary storage 108.

Upon the host cache manager 120 receiving (at block 426) the data for the requested storage address $200_R$ from the primary storage 108 via the primary storage device driver 118 and the block layer 126, the host cache manager 120 sends (at block 428) data for the requested storage address $200_R$ to the application 106 via block layer 110. The host cache manager 120 sends (at block 430) a write request to write the received data to the requested storage address $200_R$ to the SSD 112, according to the logic of FIGS. 5a and 5b, described below.

With the embodiment of FIG. 4, the latency of a read operation is reduced for a read hit because the host cache manager 120 is bypassed, to avoid having to perform any lookup and other cache algorithm operations at the host cache manager 120. Instead, the request is sent directly to the SSD 112 to perform the cache lookup operations to return the requested data for the storage address $200_R$. If there is a read miss, then the host cache manager 120 retrieves the requested data from the primary storage 108 and returns to the SSD 112 to cache.

Cache latency may further be reduced by providing additional hardware and accelerators to implement the SSD cache manager 130 to improve the speed at which the SSD cache manager 130 performs the lookup operations to access the requested data at a cache location $300_i$.

Figure 5A:
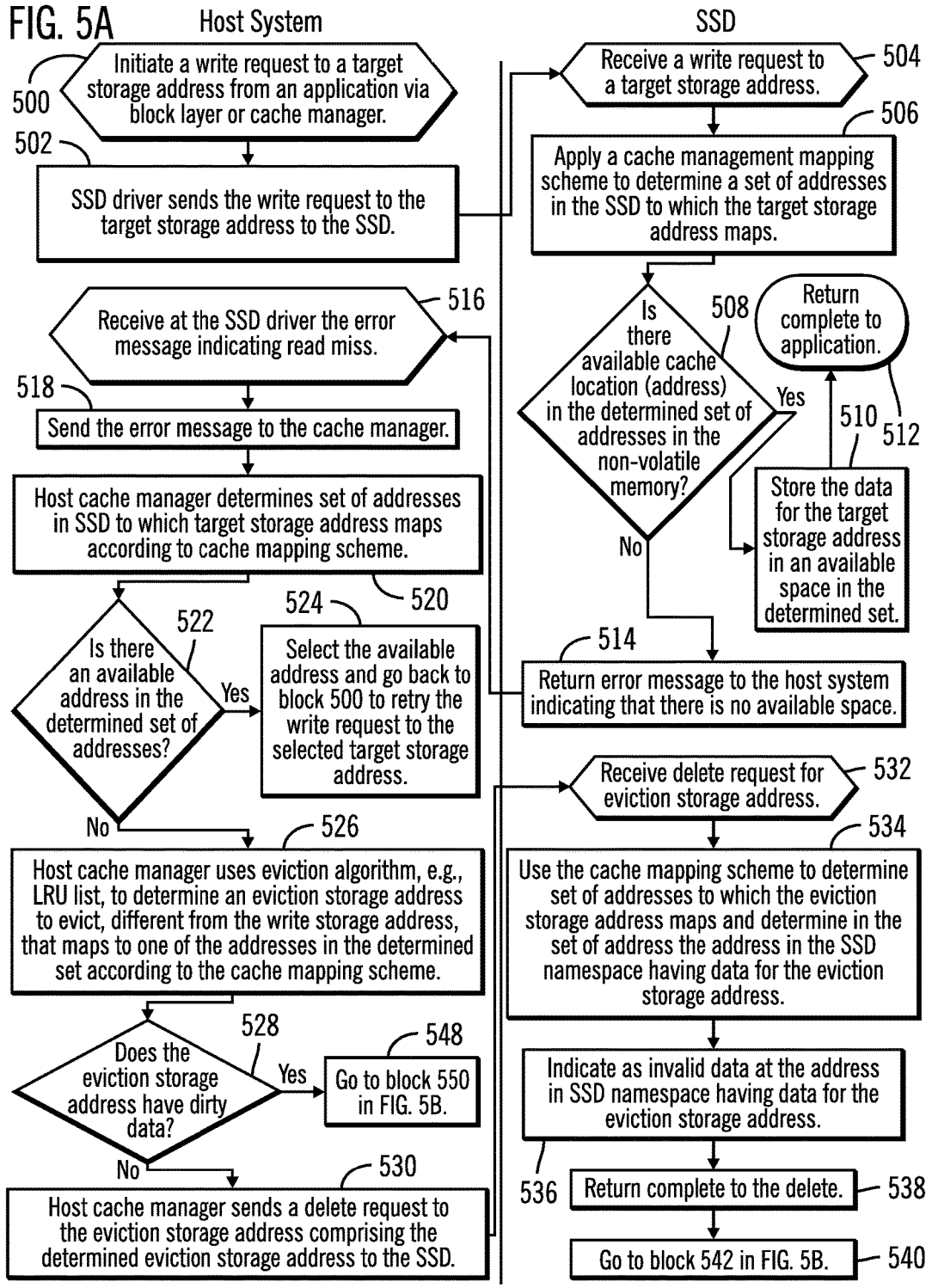
FIGS. 5a and 5b illustrate an embodiment of operations for a host system and Solid State Drive (SSD) to process a write request.
Figure 5B:
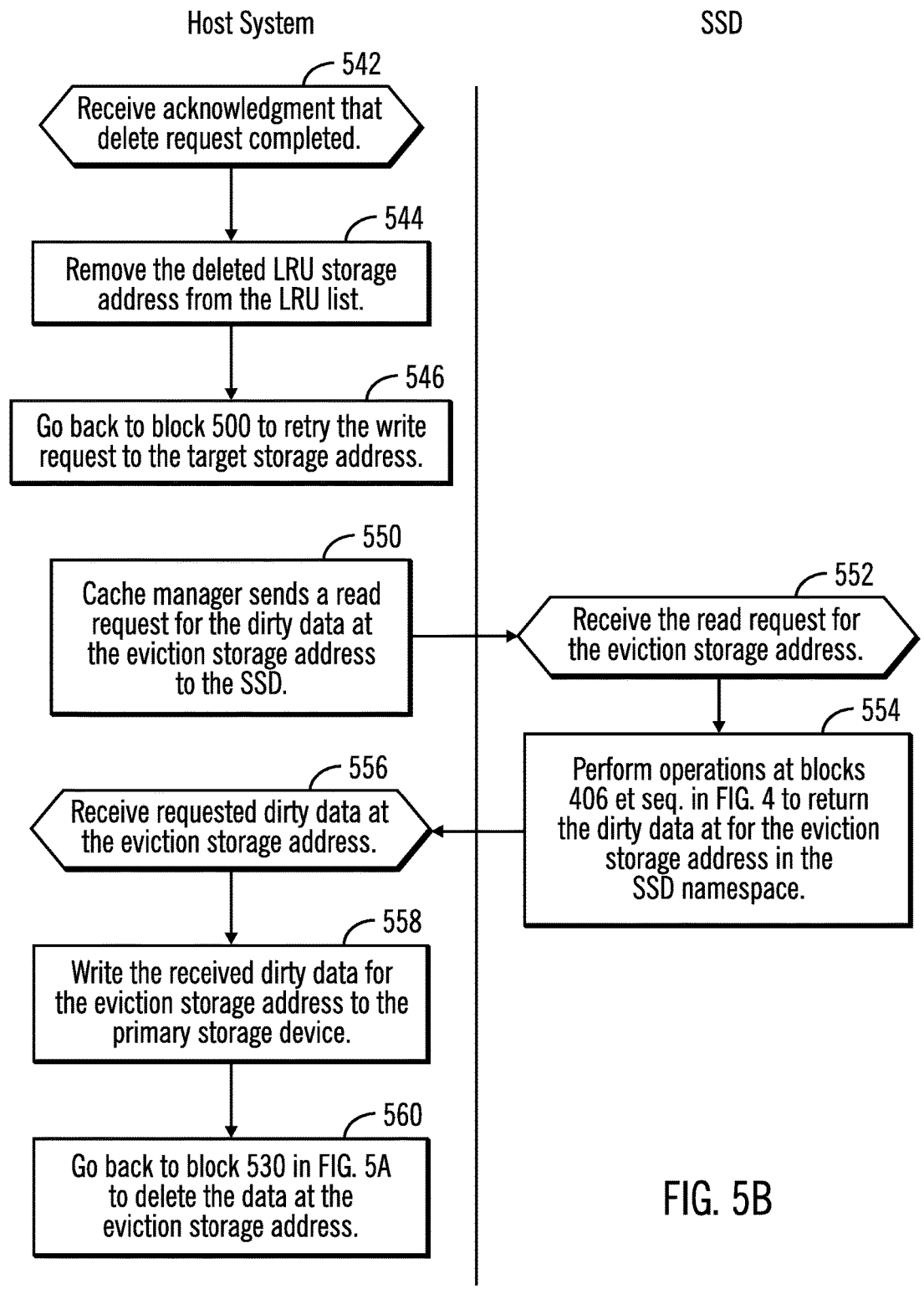

FIGS. 5a and 5b illustrate an embodiment of operations performed by the SSD 112 and the host system 100 components to process a write request to a storage address $200_W$ in the primary storage 108, where $200_W$ refers to a write storage address to which a write is directed. The write request may be initiated from an application 106 or by the host cache manager 120 to perform a write for a read miss, such as at block 530 in FIG. 5. Upon initiating (at block 500) a write request to a target address $200_W$ from an application 106 via the block layer 110 or from the host cache manager 120, the SSD driver 114 sends (at block 502) the write request to the target storage address $200_W$ to the SSD 112.

Upon the SSD 112 receiving (at block 504) a write request to the target storage address $200_W$, the SSD cache manager 130 applies (at block 506) a cache management mapping scheme, such as a set associative cache management scheme, to determine a set of cache locations $134_i$ in the SSD 112 to which the target storage address $200_W$ maps, which set may be determined from the set bits 204 of the address $200_W$. If (at block 508) there is an available cache location $300_i$ or address in the SSD namespace in the determined set of address $134_i$, then the SSD cache manager 130 stores (at block 510) the data for the target storage address $200_W$ in an available space in the determined set of addresses $102_i$ (cache locations $300_i$). After the data is written, at block 508, the host cache manager 120 upon receiving acknowledgment of the write completing would add the written target storage address $200_W$ to the LRU information 122, at the most recently used end of the LRU list 122 and return complete (at block 512) to the host application 106. If (at block 508) there is no available cache location $300_i$, in the determined set $134_i$ to which the target storage address $200_W$ maps, then the SSD cache manager 130 returns (at block 514) an error message to the host system 100 indicating that there is no available space for write data to the target storage address $200_W$.

Upon the SSD driver 114 in the host system 100 receiving (at block 516) the error message indicating a read miss, the SSD driver 114 sends (at block 518) the error message to the host cache manager 120. The host cache manager 120 determines (at block 520) a set of addresses $134_i$ in the SSD 112 to which the target storage address $200_W$ maps according a cache management scheme, comprising the same cache management scheme used by the SSD cache manager 130. If (at block 522) there is an available address, e.g., cache location, in the determined set of addresses $134_i$ in the SSD namespace, then the host cache manager 120 selects (at block 524) the available address in the determined set of addresses $134_i$ in the SSD namespace and proceeds back to block 500 to retry the write request to the selected target storage address. If (at block 522) there is no available storage address, e.g., cache location, in the determined set of addresses $134_i$ in the SSD namespace, then the host cache manager 120 uses (at block 526) a cache eviction algorithm, e.g., the LRU list 122 and LRU cache algorithm, to determine an eviction storage address $200_E$, other than the write storage address $200_W$, that maps to one of the addresses in the determined set of addresses $134_i$ in the SSD namespace. In one embodiment, the host cache manager 120 determines the eviction storage address $200_E$ using a least recently used (LRU) algorithm that determines a least recently used target storage address $200_{LRU}$ in the LRU information 122, that also maps to one of the addresses in the determined set $134_i$, different from the target storage address $200_W$, according to the cache mapping scheme. The LRU information 122 may indicate whether each target address in the SSD 112 has dirty data. If (at block 528) the determined eviction storage address $200_E$ does not have dirty data, i.e., modified data, then the host cache manager 120 sends (at block 530) a delete request to the eviction storage address $200_E$, e.g., the least recently used storage address $200_{LRU}$, to the SSD 112 via the SSD driver 114.

Upon (at block 532) the SSD 112 receiving the delete request for the eviction storage address $200_E$, the SSD cache manager 130 uses (at block 534) the cache mapping scheme to determine a set of addresses $134_i$ to which the eviction storage address maps $200_E$ and determine in the set of address $134_i$ the cache location $300_i$, having data for the eviction storage address $200_E$. The SSD cache manager 130 indicates (at block 536) invalid data at the determined address $300_i$, e.g., cache location, in the SSD namespace having data for the eviction storage address $200_E$, such as by setting the valid/dirty flags 302 to indicate the data is invalid. Complete is then returned (at block 538) to the delete.

Control then proceeds (at block 540) to block 542 in FIG. 5b where the host cache manager 120 upon receiving (at block 542) acknowledgment that the delete request completed, the host cache manager 120 removes (at block 544) the deleted eviction storage address $200_E$, e.g., LRU storage address $200_{LRU}$, from the LRU information 122, and control proceeds (at block 546) back to block 500 to retry the write request to the target storage address $200_W$.

If (at block 528) the determined LRU storage address has dirty data, then control proceeds (at block 548) to block 550 in FIG. 5b where the host cache manager 120 sends a read request for the dirty data at the eviction storage address $200_E$ to the SSD 112. Upon receiving (at block 552) the read request for the eviction storage address $200_E$, the SSD cache manager 130 performs (at block 554) the operations at block 406 et seq. in FIG. 4 to return the dirty data at the eviction storage address $200_E$ in the SSD namespace. The read request at block 552 would comprise a read hit because the host cache manager 120 determined the eviction storage address from the host LRU information 122.

Upon the host cache manager 120 receiving (at block 556) the requested dirty data at the eviction storage address $200_E$, the host cache manager 120 writes (at block 558) the received dirty data for the eviction storage address $200_E$ to the primary storage 108 via the block layer 126 and primary storage device driver 118. Control then proceeds (at block 560) back to block 530 in FIG. 5a where the host cache manager 120 deletes the data at the eviction storage address $200_E$ from the SSD 112.

With the embodiment of operations if FIGS. 5a and 5b, a write operation from an application 106 may be performed with minimal latency by bypassing any host-side cache manager to be written directly to the SSD 112. Only if there is not sufficient available space for the storage address to write, would the host cache manager 120 need to get involved to free space in the SSD 112 for the new write. Further, the host cache manager 120 would coordinate evicting data for storage addresses from the SSD 112 to ensure that any dirty data is updated to the primary storage 108 before being evicted to maintain data consistency.

Figure 6:
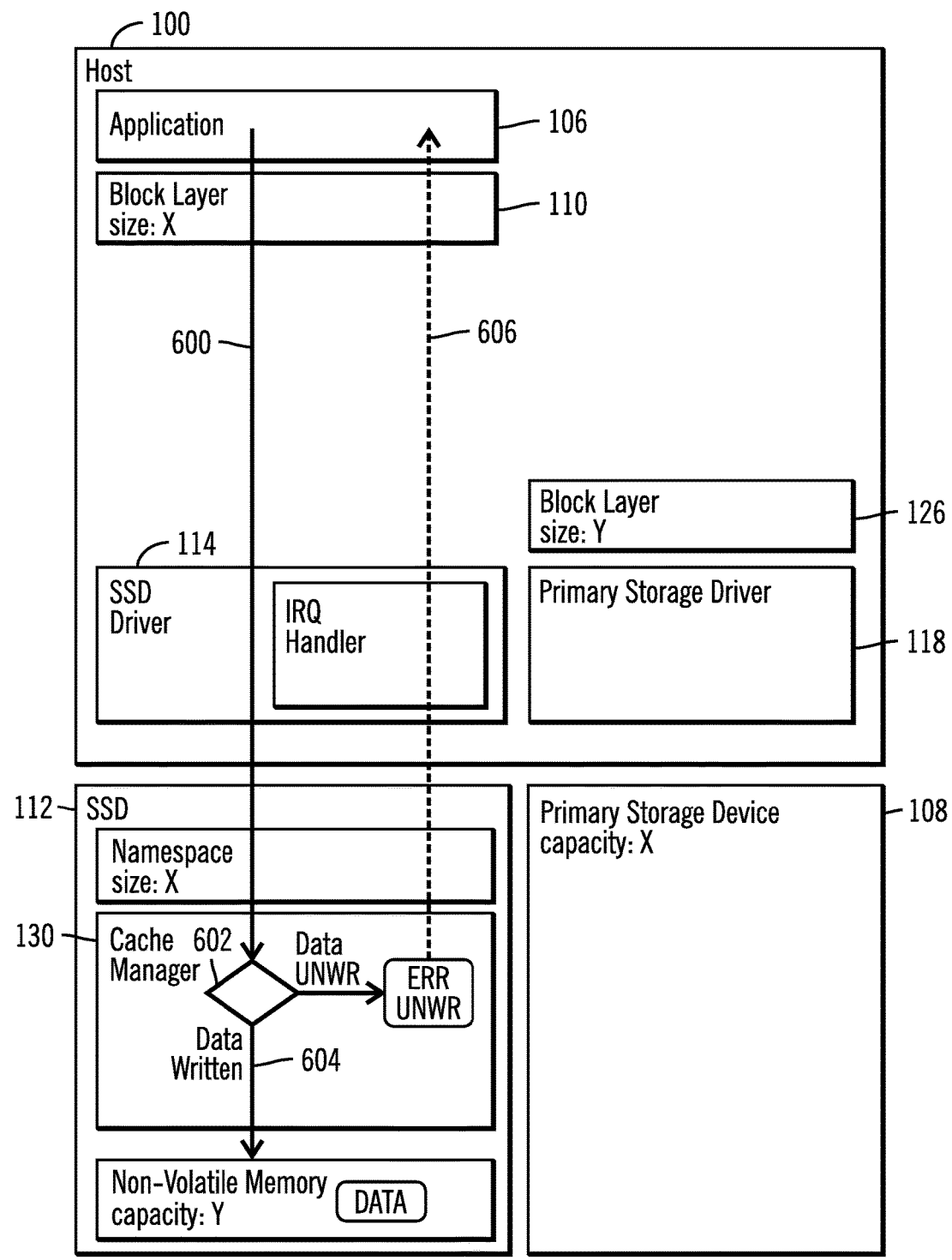
FIG. 6 illustrates an embodiment of a read hit flow.

FIG. 6 illustrates the read hit flow through host 100 components to the SSD 112, that bypasses any cache manager 120 logic to return the data directly from the SSD 112 to substantially reduce read hit latency. Path 600 shows the application 106 read request proceeding directly to the SSD 112 without any latency introduced by a cache management layer. Decision 602 shows the SSD cache manager 130 determining whether there is read hit, and if so the SSD storage media 132 is accessed with step 604 to return the data on path 606 directly to the application 106, completely bypassing any host cache operations that would introduce latency for a read hit. In this way, FIG. 6 shows zero cache latency for a read hit to the SSD 112.

Figure 7:
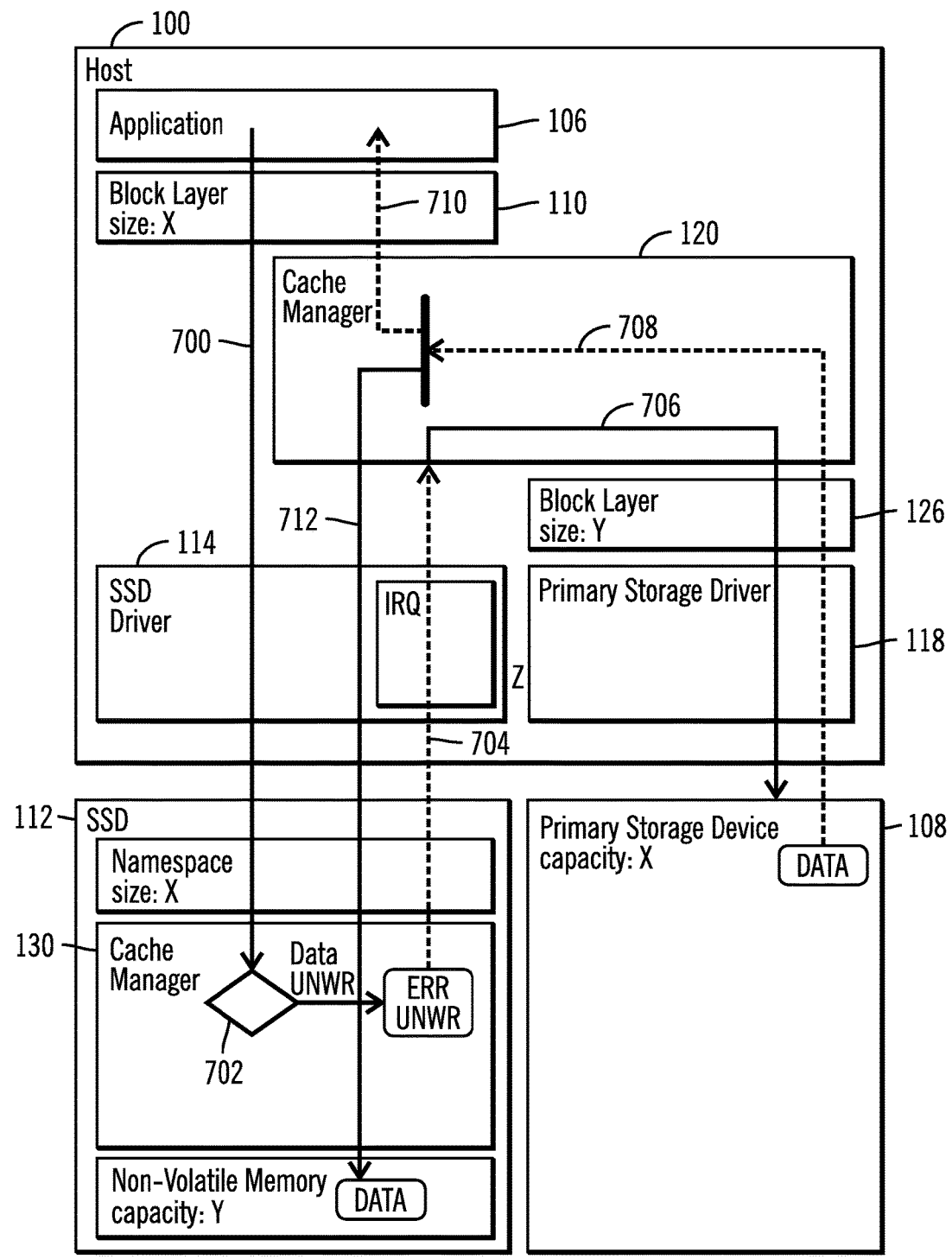
FIG. 7 illustrates an embodiment of a read miss flow.

FIG. 7 illustrates the read miss flow through host 100 components to the SSD 112, that involves the host cache manager 120 returning the data from the primary storage 108. Path 700 shows a write request to the SSD cache manager 130 resulting in a decision 702 of a read miss that returns an error on path 704 to the host system 100, which causes the host cache manager 120 to request the read data on path 706 from the primary storage 108, resulting in the read data form the primary storage 108 being returned on path 808 to the host cache manager 120 to return to both the application 106 on path 710 and the SSD 112 on path 712 to cache. A read miss thus eliminates the latency from having the host cache determine whether the requested data is in the SSD 112.

Figure 8:
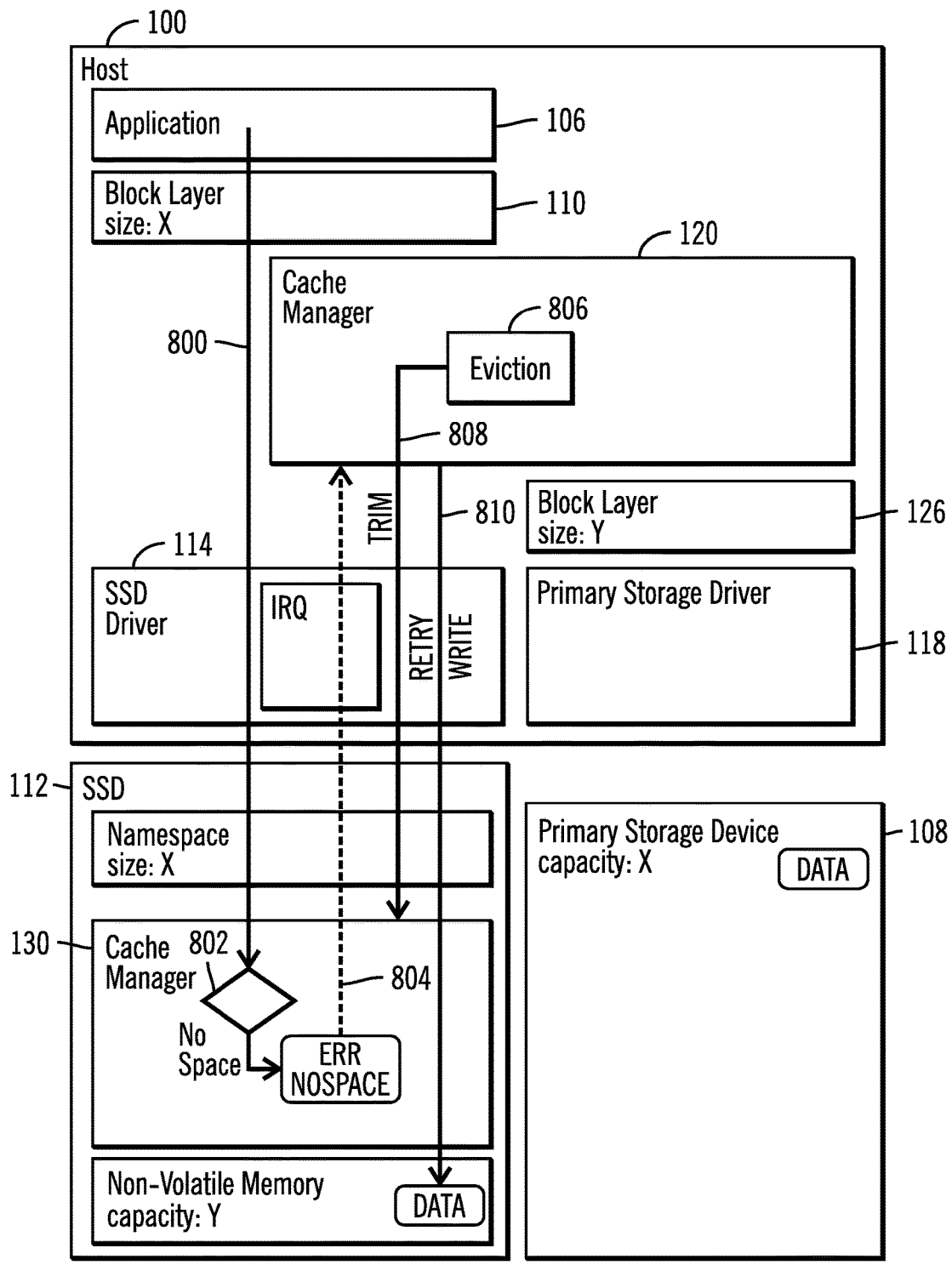
FIG. 8 illustrates an embodiment of a flow to evict data from the Solid State Drive (SSD) to make space available for a write.

FIG. 8 illustrates a write flow when there is not sufficient space available in the SSD 112 for write data, that involves the host cache manager 120 having to evict data from the SSD device to make space to write data for a target storage address $200_W$. Path 800 shows the write request going directly from the application 106 to the SSD 112, bypassing the host-side cache 124. Upon the SSD cache manager 130 determining at decision point 802 that there is not sufficient space in the SSD namespace for further write data, the error message of no space is returned on path 804 to the host cache manager 120, which then invokes host eviction logic 806 that sends a TRIM request on path 808 to remove data from the SSD namespace. Path 810 shows a retry of the write request once space is made available.

The described embodiments may be implemented as a method, apparatus, device, and computer program product comprising a computer readable storage medium using standard programming and/or engineering techniques to produce software, firmware, hardware, or any combination thereof. The described operations may be implemented as code or logic maintained in a "computer readable storage medium". The term "code" as used herein refers to software program code, hardware logic, firmware, microcode, etc. The computer readable storage medium, as that term is used herein, includes a tangible element, including at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), computer encoded and readable punch cards, etc. The computer readable storage medium may further comprise a hardware device implementing firmware, microcode, etc., such as in an integrated circuit chip, a programmable logic device, a Programmable Gate Array (PGA), field-programmable gate array (FPGA), Application Specific Integrated Circuit (ASIC), etc. Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals, but includes physical and tangible components. Those skilled in the art will recognize that many modifications may be made to this configuration without departing from the scope of the present invention, and that the article of manufacture may comprise suitable information bearing medium known in the art.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

The reference characters used herein, such as b, i, and n, are used herein to denote a variable number of instances of an element, which may represent the same or different values, and may represent the same or different value when used with different or the same elements in different described instances.

EXAMPLES

The following examples pertain to further embodiments.

Example 1 is an apparatus for cache management operations to perform cache operations for a host system in a solid state drive, comprising: a cache memory comprising non-volatile memory, the cache memory to store data at addresses for a cache memory namespace; and a cache manager to: determine whether data for a requested storage address in a primary storage namespace received from the host system is stored at an address in the cache memory namespace to which the requested storage address maps according to a cache mapping scheme, wherein multiple of the storage addresses in the primary storage map to one address in the cache memory namespace; and return to the host system the data at the requested address stored in the cache memory namespace in response to determining that the data for the requested storage address is stored in the cache memory namespace.

In Example 2, the subject matter of examples 1 and 3-9 can optionally include that the cache manager is further to: return a message to the host system indicating that the data for the requested storage address is not stored in the cache memory namespace, wherein the message causes the host system to retrieve the data for the requested storage address from the primary storage.

In Example 3, the subject matter of examples 1, 2 and 4-9 can optionally include that the cache manager is further to: receive data for the requested storage address from the host system the host system retrieved from the primary storage in response to receiving the message; and store the received data for the requested storage address in the cache volatile memory namespace.

In Example 4, the subject matter of examples 1-3 and 5-9 can optionally include that the cache manager is further to: receive, from the host system, data for a target storage address of the primary storage namespace to add to the cache memory namespace; determine whether there is an available address in the cache memory namespace for the received data to which the storage address maps according to the cache mapping scheme; and storing the data for the target storage address in the determined available address in the cache memory namespace.

In Example 5, the subject matter of examples 1-4 and 6-9 can optionally include that the cache manager is further to: return a message to the host system indicating that there is no available space in the cache memory namespace for the data at the target storage address; receive a delete request from the host system to delete data for an eviction storage address in the primary storage different from the target storage address, wherein both the target storage address and the eviction storage address map to a same set of addresses in the cache memory namespace; determine an eviction address in the cache memory namespace having data for the eviction storage address; delete the data at the eviction address in the cache memory namespace; and write the data for the target storage address to the eviction address in the cache memory namespace.

In Example 6, the subject matter of examples 1-5 and 7-9 can optionally include that the cache manager is further to: receive a retry write request from the host system after receiving the delete request, wherein the data for the target storage address is written to the eviction address in the cache memory namespace in response to the retry write request.

In Example 7, the subject matter of examples 1-6 and 8-9 can optionally include that the cache manager is further to: receive a request from the host system to read data at the eviction storage address that comprises dirty data; and return the dirty data at the eviction address in the cache memory namespace, wherein the delete request to delete the data for the eviction storage address is received after returning the dirty data.

In Example 8, the subject matter of examples 1-7 and 9 can optionally include that the cache mapping scheme comprises a set associative cache mapping scheme.

In Example 9, the subject matter of examples 1-8 can optionally include that the cache memory comprises a byte addressable write-in-place cache memory.

Example 10 is a computer program product that when deployed in a host system couples to a cache memory and a primary storage having a larger address space than a cache memory namespace of the cache memory, wherein the computer program product comprises a computer readable storage medium including program code that when executed by a processor is to: send a read request to the cache memory to read data at a read storage address in the primary storage;

and receive, from the cache memory, data at an address in the cache memory namespace to which the read storage address maps according to a cache mapping scheme.

In Example 11, the subject matter of examples 10 and 12-17 can optionally include that the program code includes a cache manager, wherein the program code when executed is further to: determine, by the cache manager, a storage address in the primary storage for data stored in the cache memory namespace to evict from the cache memory device; and send read and write requests to storage addresses in the primary storage directly to the cache memory.

In Example 12, the subject matter of examples 10, 11 and 13-17 can optionally include that the read request comprises a first read request, wherein the program code when executed is further to: receive a message from the cache memory indicating that the data for the read storage address is not stored in the cache memory namespace; and send a second read request to read data at the read storage address to the primary storage.

In Example 13, the subject matter of examples 10-12 and 14-17 can optionally include that the program code when executed is further to: write the read data at the read storage address returned from the primary storage to the cache memory to store in the cache memory namespace.

In Example 14, the subject matter of examples 10-13 and 15-17 can optionally include that the program code when executed is further to: send a write request to write data to a target storage address in the primary storage to the cache memory device; receive from the cache memory a message indicating that there is no available space in the cache memory namespace for the target storage address; determine an eviction storage address for the primary storage for which data is stored in the cache memory namespace; and send a delete request to the cache memory to delete the data at the eviction storage address.

In Example 15, the subject matter of examples 10-14 and 16-17 can optionally include that the program code when executed is further to: send a retry of the write of data for the target storage address to the cache memory in response to sending the delete request to cause the cache memory to write the data for the target storage address to an address in the cache memory namespace storing data for the eviction storage address.

In Example 16, the subject matter of examples 10-15 and 17 can optionally include that the determine the eviction storage address comprises: use a cache mapping scheme to determine a set of addresses in the cache memory namespace to which the target storage address maps; and determine a least recently used target storage address for the primary storage that maps to one of the addresses in the determined set, wherein the eviction storage address comprises the determined least recently used target storage address.

In Example 17, the subject matter of examples 10-16 can optionally include that the program code when executed is further to: determine whether data for the eviction storage address stored in the cache memory comprises dirty data; send a read request to the cache memory to read the dirty data at the eviction storage address; and write the read dirty data, received from the cache memory in response to the read request to read the dirty data at the eviction storage address, to the primary storage, wherein the delete request is sent to the cache memory in response to writing the read dirty data to the primary storage.

Example 18 is a system coupled to perform cache operations for a host system in a solid state drive for data requests for a primary storage, including: a host system including a processor and a memory including a host cache manager executed by the processor; and a cache memory, including: a storage media in which data is stored at addresses for a cache memory namespace; and a cache memory cache manager to: determine whether data for a requested storage address in the primary storage namespace received from the host system is stored at an address in the cache memory namespace at an address in the cache memory namespace to which the requested storage address maps according to a cache mapping scheme, wherein multiple of the storage addresses in the primary storage map to one address in the cache memory namespace; and return to the host system the data at the requested address stored in the cache memory namespace in response to determining that the data for the requested storage address is stored in the cache memory namespace.

In Example 19, the subject matter of examples 18 and 20-22 can optionally include that the cache memory cache manager is further to return a message to the host system indicating that the data for the requested storage address is not stored in the cache memory namespace, and wherein the host cache manager retrieves the data for the requested storage address from the primary storage in response to the message.

In Example 20, the subject matter of examples 18, 19, 21, and 22 can optionally include that the cache memory cache manager is further to: receive, from the host system, data for a target storage address of the primary storage namespace to add to the cache memory namespace; determine whether there is an available address in the cache memory namespace for the received data to which the storage address maps according to the cache mapping scheme; and store the data for the target storage address in the determined available address in the cache memory namespace.

In Example 21, the subject matter of examples 18, 19, 20, and 22 can optionally include that the host cache manager and the cache memory cache manager are further to: return, by the cache memory cache manager, a message to the host system indicating that there is no available space in the cache memory namespace for the data at the target storage address; in response to the message indicating that there is no available space, the host cache manager is further to: determine an eviction storage address for the primary storage for which data is stored in the cache memory namespace; and send a delete request to the cache memory to delete the data at the eviction storage address; in response to the delete request, the cache memory cache manager is further to: determine an eviction address in the cache memory namespace having data for the eviction storage address; delete the data at the eviction address in the cache memory namespace; and write the data for the target storage address to the eviction address in the cache memory namespace.

In Example 22, the subject matter of examples 18-21 can optionally include that the host cache manager and the cache memory cache manager are further to: determine, by the host cache manager, whether data for the eviction storage address stored in the cache memory comprises dirty; send, by the host cache manager, a read request to the cache memory to read the dirty data at the eviction storage address; and write the read dirty data, received from the cache memory in response to the read request to read the dirty data at the eviction storage address, to the primary storage, wherein the delete request is sent to the cache memory in response to writing the read dirty data to the primary storage.

Example 23 is a method for performing cache operations for a host system in a solid state drive, comprising: determining whether data for a requested storage address in a primary storage namespace received from a host system is stored at an address in a cache memory namespace of the cache memory to which the requested storage address maps according to a cache mapping scheme, wherein multiple of the storage addresses in the primary storage map to one address in the cache memory namespace; and returning to the host system the data at the requested address stored in the cache memory namespace in response to determining that the data for the requested storage address is stored in the cache memory namespace.

In Example 24, the subject matter of examples 23, 25, 26 can optionally include returning a message to the host system indicating that the data for the requested storage address is not stored in the cache memory namespace, wherein the message causes the host system to retrieve the data for the requested storage address from the primary storage.

In Example 25 the subject matter of examples 23, 24, 26 can optionally include receiving, from the host system, data for a target storage address of the primary storage namespace to add to the cache memory namespace; determining whether there is an available address in the cache memory namespace for the received data to which the storage address maps according to the cache mapping scheme; and storing the data for the target storage address in the determined available address in the cache memory namespace.

In Example 26, the subject matter of examples 23-25 can optionally include returning a message to the host system indicating that there is no available space in the cache memory namespace for the data at the target storage address; receiving a delete request from the host system to delete data for an eviction storage address in the primary storage different from the target storage address, wherein both the target storage address and the eviction storage address map to a same set of addresses in the cache memory namespace; determining an eviction address in the cache memory namespace having data for the eviction storage address; deleting the data at the eviction address in the cache memory namespace; and writing the data for the target storage address to the eviction address in the cache memory namespace.

Example 27 is a system for performing cache management operations coupled to a cache memory and a primary storage having a larger address space than a cache memory namespace of the cache memory, that executes program code to: send a read request to the cache memory to read data at a read storage address in the primary storage; and receive, from the cache memory, data at an address in the cache memory namespace to which the read storage address maps according to a cache mapping scheme.

In Example 28, the subject matter of examples 27 and 29-34 can optionally include that the program code includes a cache manager, wherein the program code when executed is further to: determine, by the cache manager, a storage address in the primary storage for data stored in the cache memory namespace to evict from the cache memory device; and send read and write requests to storage addresses in the primary storage directly to the cache memory.

In Example 29, the subject matter of examples 27, 28 and 30-34 can optionally include that the read request comprises a first read request, wherein the program code when executed is further to: receive a message from the cache memory indicating that the data for the read storage address is not stored in the cache memory namespace; and send a second read request to read data at the read storage address to the primary storage.

In Example 30, the subject matter of examples 27-29 and 31-34 can optionally include that the program code when executed is further to: write the read data at the read storage address returned from the primary storage to the cache memory to store in the cache memory namespace.

In Example 31, the subject matter of examples 27-30 and 32-34 can optionally include that the program code when executed is further to: send a write request to write data to a target storage address in the primary storage to the cache memory device; receive from the cache memory a message indicating that there is no available space in the cache memory namespace for the target storage address; determine an eviction storage address for the primary storage for which data is stored in the cache memory namespace; and send a delete request to the cache memory to delete the data at the eviction storage address.

In Example 32, the subject matter of examples 27-31 and 33-34 can optionally include that the program code when executed is further to: send a retry of the write of data for the target storage address to the cache memory in response to sending the delete request to cause the cache memory to write the data for the target storage address to an address in the cache memory namespace storing data for the eviction storage address.

In Example 33, the subject matter of examples 27-32 and 34 can optionally include that the determine the eviction storage address comprises: use a cache mapping scheme to determine a set of addresses in the cache memory namespace to which the target storage address maps; and determine a least recently used target storage address for the primary storage that maps to one of the addresses in the determined set, wherein the eviction storage address comprises the determined least recently used target storage address.

In Example 34, the subject matter of examples 27-33 can optionally include that the program code when executed is further to: determine whether data for the eviction storage address stored in the cache memory comprises dirty data; send a read request to the cache memory to read the dirty data at the eviction storage address; and write the read dirty data, received from the cache memory in response to the read request to read the dirty data at the eviction storage address, to the primary storage, wherein the delete request is sent to the cache memory in response to writing the read dirty data to the primary storage.

Example 35 is an apparatus for performing cache operations for a host system in a solid state drive, comprising: means for determining whether data for a requested storage address in a primary storage namespace received from a host system is stored at an address in a cache memory namespace of the cache memory to which the requested storage address maps according to a cache mapping scheme, wherein multiple of the storage addresses in the primary storage map to one address in the cache memory namespace; and means for returning to the host system the data at the requested address stored in the cache memory namespace in response to determining that the data for the requested storage address is stored in the cache memory namespace.

Example 36 is an apparatus comprising means to perform a method as claimed in any preceding claim.

Example 37 is a machine-readable storage including machine-readable instructions, when executed, to implement a method or realize an apparatus as claimed in any preceding claim.

What is claimed:

1. An apparatus implemented in a non-volatile memory device including a cache memory comprising non-volatile memory and in communication with a host system using a primary storage having a primary storage namespace, comprising:
a cache manager to store data in a cache memory namespace, to:
determine whether data for a requested storage address in the primary storage namespace received from the host system is stored at an address in the cache memory namespace to which the requested storage address maps according to a cache mapping scheme, wherein storage addresses in the primary storage map to one address in the cache memory namespace;
return to the host system the data at the requested storage address stored in the cache memory namespace in response to determining that the data for the requested storage address is stored in the cache memory namespace; and
return a message to the host system indicating that the data for the requested storage address is not stored in the cache memory namespace, wherein the message causes the host system to retrieve the data for the requested storage address from the primary storage.

2. The apparatus of claim 1, wherein the cache manager is further to:
receive data for the requested storage address from the host system the host system retrieved from the primary storage in response to receiving the message; and
store the received data for the requested storage address in the cache memory namespace.

3. The apparatus of claim 1, wherein the cache mapping scheme comprises a set associative cache mapping scheme.

4. The apparatus of claim 1, wherein the cache memory comprises a byte addressable write-in-place cache memory.

5. An apparatus implemented in a non-volatile memory device including a cache memory comprising non-volatile memory and in communication with a host system using a primary storage having a primary storage namespace, comprising:
a cache manager to store data in a cache memory namespace, to:
receive, from the host system, data for a target storage address of the primary storage namespace to add to the cache memory namespace;
determine whether there is an available address in the cache memory namespace for the received data to which the target storage address maps according to a cache mapping scheme;
store the data for the target storage address in the determined available address in the cache memory namespace in response to determining that there is the available address in the cache memory namespace;
return a message to the host system indicating that there is no available space in the cache memory namespace for the data at the target storage address;
receive a delete request from the host system to delete data for an eviction storage address in the primary storage different from the target storage address, wherein both the target storage address and the eviction storage address map to a same set of addresses in the cache memory namespace;
determine an eviction address in the cache memory namespace having data for the eviction storage address;
delete the data at the eviction address in the cache memory namespace; and
write the data for the target storage address to the eviction address in the cache memory namespace.

6. The apparatus of claim 5, wherein the cache manager is further to:
receive a retry write request from the host system after receiving the delete request, wherein the data for the target storage address is written to the eviction address in the cache memory namespace in response to the retry write request.

7. The apparatus of claim 5, wherein the cache manager is further to:
receive a request from the host system to read data at the eviction storage address that comprises dirty data; and
return the dirty data at the eviction address in the cache memory namespace, wherein the delete request to delete the data for the eviction storage address is received after returning the dirty data.

8. A computer program product deployed in a host system coupled to a cache memory and a primary storage having a larger address space than a cache memory namespace of the cache memory, wherein the computer program product comprises a non-transitory computer readable storage medium including program code that when executed by a processor is to:
send a read request to the cache memory to read data at a read storage address in the primary storage;
receive, from the cache memory, data at an address in the cache memory namespace to which the read storage address maps according to a cache mapping scheme;
receive a message from the cache memory indicating that the data for the read storage address is not stored in the cache memory namespace; and
send a second read request to read data at the read storage address to the primary storage in response to the message from the cache memory.

9. The computer program product of claim 8, wherein the program code includes a cache manager, wherein the program code when executed is further to:
determine, by the cache manager, a storage address in the primary storage for data stored in the cache memory namespace to evict from the cache memory; and
send read and write requests to storage addresses in the primary storage directly to the cache memory.

10. The computer program product of claim 8, wherein the program code when executed is further to:
write the read data at the read storage address returned from the primary storage to the cache memory to store in the cache memory namespace.

11. The computer program product of claim 8, wherein the program code when executed is further to:
send a write request to write data to a target storage address in the primary storage to the cache memory;
receive from the cache memory a message indicating that there is no available space in the cache memory namespace for the target storage address;
determine an eviction storage address for the primary storage for which data is stored in the cache memory namespace; and
send a delete request to the cache memory to delete the data at the eviction storage address.

12. The computer program product of claim 11, wherein the program code when executed is further to:
send a retry of the write request for the target storage address to the cache memory in response to sending the delete request to cause the cache memory to write the data for the target storage address to an address in the cache memory namespace storing data for the eviction storage address.

13. The computer program product of claim 11, wherein to determine the eviction storage address comprises:
use a cache mapping scheme to determine a set of addresses in the cache memory namespace to which the target storage address maps; and
determine a least recently used target storage address for the primary storage that maps to one of the addresses in the determined set, wherein the eviction storage address comprises the determined least recently used target storage address.

14. The computer program product of claim 11, wherein the program code when executed is further to:
determine whether data for the eviction storage address stored in the cache memory comprises dirty data;
send a read request to the cache memory to read the dirty data at the eviction storage address; and
write the read dirty data, received from the cache memory in response to the read request to read the dirty data at the eviction storage address, to the primary storage, wherein the delete request is sent to the cache memory in response to writing the read dirty data to the primary storage.

15. A system coupled to a primary storage, including:
a host system including a processor and a memory including a host cache manager executed by the processor; and
a cache memory, including:
a storage media in which data is stored at addresses for a cache memory namespace; and
a cache memory cache manager to:
determine whether data for a requested storage address in a primary storage namespace received from the host system is stored at an address in the cache memory namespace at an address in the cache memory namespace to which the requested storage address maps according to a cache mapping scheme, wherein storage addresses in the primary storage map to one address in the cache memory namespace;
return to the host system the data at the requested storage address stored in the cache memory namespace in response to determining that the data for the requested storage address is stored in the cache memory namespace; and
return a message to the host system indicating that the data for the requested storage address is not stored in the cache memory namespace, wherein the message causes the host system to retrieve the data for the requested storage address from the primary storage.

16. A system coupled to a primary storage, including:
a host system including a processor and a memory including a host cache manager executed by the processor; and
a cache memory, including:
a storage media in which data is stored at addresses for a cache memory namespace; and
a cache memory cache manager to:
receive, from the host system, data for a target storage address of a primary storage namespace to add to the cache memory namespace;
determine whether there is an available address in the cache memory namespace for the received data to which the storage address maps according to a cache mapping scheme;
store the data for the target storage address in the determined available address in the cache memory namespace; return, by the cache memory cache manager, a message to the host system indicating that there is no available space in the cache memory namespace for the data at the target storage address; and
in response to the message indicating that there is no available space, the host cache manager is further to:
determine an eviction storage address for the primary storage for which data is stored in the cache memory namespace; and
send a delete request to the cache memory to delete the data at the eviction storage address;
in response to the delete request, the cache memory cache manager is further to:
determine an eviction address in the cache memory namespace having data for the eviction storage address;
delete the data at the eviction address in the cache memory namespace; and
write the data for the target storage address to the eviction address in the cache memory namespace.

17. The system of claim 16, wherein the host cache manager and the cache memory cache manager are further to:
determine, by the host cache manager, whether data for the eviction storage address stored in the cache memory comprises dirty data;
send, by the host cache manager, a read request to the cache memory to read the dirty data at the eviction storage address; and
write the read dirty data, received from the cache memory in response to the read request to read the dirty data at the eviction storage address, to the primary storage, wherein the delete request is sent to the cache memory in response to writing the read dirty data to the primary storage.

18. A method for a cache memory, comprising:
determining whether data for a requested storage address in a primary storage namespace of a primary storage received from a host system is stored at an address in a cache memory namespace of the cache memory to which the requested storage address maps according to a cache mapping scheme, wherein storage addresses in the primary storage map to one address in the cache memory namespace;
returning to the host system the data at the requested address stored in the cache memory namespace in response to determining that the data for the requested storage address is stored in the cache memory namespace; and
returning a message to the host system indicating that the data for the requested storage address is not stored in the cache memory namespace, wherein the message causes the host system to retrieve the data for the requested storage address from the primary storage.

19. The method of claim 18, further comprising:
receiving, from the host system, data for a target storage address of the primary storage namespace to add to the cache memory namespace;

determining whether there is an available address in the cache memory namespace for the received data to which the storage address maps according to the cache mapping scheme; and storing the data for the target storage address in the determined available address in the cache memory namespace.

\* \* \* \* \*